7758X
J. Kyle,
No Printed Specification Availab
Door Lock,
Patented Sep. 16, 1833.
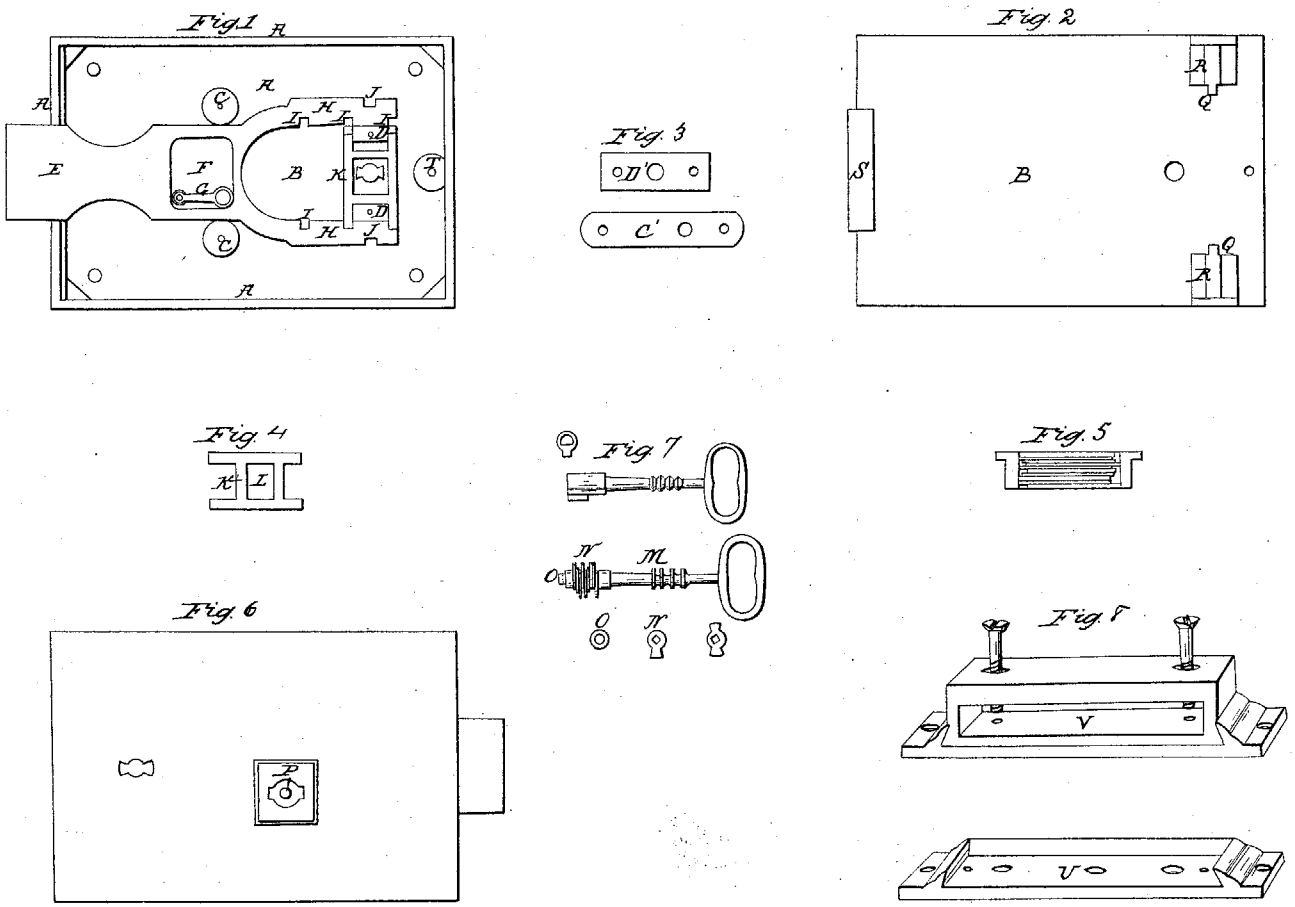
AM. PHOTO-LITHO. CO. N.Y. (OSBORNE'S PROCESS.)

[illegible] Sept 16 1833 1.

James Kyle Ramapo County of Rockland New York

7758X Letters Patent

The schedule referred to in these Letters Patent and making part of the same con
taining a description in the words of the said James Kyle himself of his improve
ments in the door lock in addition to those for which a patent was granted to him
on the 18th May 1832.

To all whom it may concern. Be it known that I James Kyle of Ramapo in the County
of Rockland and State of New York did make certain improvements in the door lock
intended for the doors of Banks and other places where great security is required for
which improvements Letters Patent of the United States were granted unto me
on the eighteenth day of May in the Year one thousand Eight hundred and
thirty two; and that since that period I have further improved the said lock
and have thereby rendered it more efficient and certain in its operation and
I do hereby declare that the following is a full and exact description of these
improvements reference being had to the drawings which accompany this Specifi
cation and make part thereof. The box or frame of this Lock AA fig 1 which
contains the bolt and its appendages is in one entire piece. The plate B all which is
the outer plate when the lock is upon the door is in one piece covering the whole of the
box or frame. The two [illegible] C C and the other [illegible] D D rise from the plate A to which
they are firmly joined being usually cast in one piece therewith they extend up
the whole thickness of the bolt to which they serve as guides, and they also serve
the cap plate C and D which are to be secured on them.
The bolt B which may be made to throw out in a [illegible]
in the same direction or as is sometimes done in iron doors to throw out in [illegible]
several directions is perforated at F in the manner of my former lock; this perforation
or mortise likewise containing within it the [illegible] or cam G by which the bolt
is to be moved backward and forward. At the back end the bolt branches off into two parts
H H leaving an open space between them as seen in the drawing. On the inner
side of each of these branches there are three grooves I I I extending down through
the whole depth of the bolt; and there is likewise a single groove or notch J J at

[illegible]

[illegible] end of each of these, [illegible] [illegible] extend only through the thickness of a flanch
which projects one from the body of the bolt, along each of these edges to a distance
equal to the depth of the groove or notch, and which may be one fourth of an inch
more or less in thickness. The use of these flanches will be presently described. Instead
of the levers used by me in my lock as first patented, which levers served to hold the
bolt until they were lifted by the key, I use twenty or any other number of sliding
pieces usually made of steel plate in the general form of that seen at K in its place
or at K Fig 4. these pieces in their united capacity I denominate the rack of the lock.
These from projecting sides when they are
placed between the guide studs DD are guided by these and fall into or are received
by one or more of the grooves FF according to circumstances. The open space [illegible] serves
to admit the bit of the key [illegible] upon which the cams or lifters are placed in a way
much like that described in my first patent. I however usually make the opening
in these cams or lifters square or in any other form by which they will be held in
proper directions when slipped upon the stem or shank of the key.
These are shown separately at N N and the [illegible] by
which they are fixed at O. The shape of the opening [illegible] may be varied in any way
so that it admits the key to act properly upon the rack pieces; these pieces also may
have but one projection or more than two projections at each end, the bolt being
varied accordingly to receive them. I generally make the cams or lifters N of dif-
ferent lengths and also of different thicknesses and form a rack piece to correspond with
each cam or lifter; lettering or numbering the corresponding pieces in order that they
may be readily placed so as to harmonize with each other; the number of combi-
nations of which these pieces are susceptible may in either of these ways be indef-
initely extended. Fig 5 is a transverse section of the bolt through the grooves in
which the rack pieces pass, and also through the pieces themselves. This section
exhibits also the flanches formerly named projecting from the branches HH of the
bolt. Knobs with a shaft passing through the tumbler G may be used to move the
bolt, but for the purpose to which it is intended most commonly to apply this
lock I employ only a short stem P seen projecting through the plate of the
lock which is attached to the door Fig 6. The kind of key which may be used
to act upon the tumbler and move the bolt with the force which may be given
to the pipe which is to pass over the stem P are shown in Fig 6. This lock is

[illegible]

[illegible] secured on to the door through holes in the plate A Fig 1 when the plate [illegible] Fig 2 [illegible] in its place This latter plate is then put on in such a way that it cannot be removed without the assistance of the two keys. These I have effected in [illegible] [illegible] ways many of which I exhibited in the drawing to exemplify the principle and [illegible] I believe one of the best and most simple of these modes a a are projecting hook pieces upon the [illegible] K K which hook pieces pass through the notches J J in the bolt of the lock and catch under the flanches upon its edges. S is a piece of metal [illegible] with [illegible] projecting from the plate B which piece is dovetailed or grooved at each end and falls into a space corresponding with it over the bolt B in the edge of the box or frame of the lock at its front end. When this is slipped into its place, the hook pieces a a will not fall into their openings when the bolt is shot out to about half its full distance and it must therefore be brought into this position in order to remove the plate.

To prevent all motion in this plate when in its place a screw is passed through in the back [illegible] into the stud T Fig 1 [illegible] this arrangement the lock cannot be removed from the door on the inside without the use of both the keys. I also make the box which receives the bolt in such a way that it cannot be removed from the door post when the door is closed. The mode in which I do this is shown in Fig 8. U is a plate which is first screwed on and which has dovetailed or other formed grooves at each end. The box part V slips into these grooves and covers the screw heads. This box part is then attached to the plate U by the [illegible] the removal of which however will not admit of the box being removed without first opening the door. When the bolt is in the proper place the rock pieces fall into their corresponding grooves by their own gravity but should they not do so readily the action of the key upon them will force them forward which was not the case with the levers formerly used by me.

What I claim as constituting the improvements for which I ask a patent is the use of the pieces which I denominate the rock of the lock with the different variations of which they are susceptible whilst still operating upon the principle described which I do not consider as identical with that of the lever in my former patent. I also claim the attaching of the outer plate to the lock by means which prevent its being detached without the agency of the keys, and the attaching of the box to receive the bolt so that it cannot be removed whilst the door is closed.

Witnesses } Thomas P. Jones }
J. S. [illegible] }
1833 [illegible]

[illegible]

[illegible]